(12) United States Patent
Suzuki et al.

(10) Patent No.: US 7,416,570 B2
(45) Date of Patent: Aug. 26, 2008

(54) HYDROGEN GENERATOR AND FUEL CELL POWER GENERATION SYSTEM

(75) Inventors: Motohiro Suzuki, Suita (JP); Tomonori Asou, Kitakatsuragi-gun (JP); Yuji Mukai, Kadoma (JP); Kunihiro Ukai, Ikoma (JP); Akira Maenishi, Ikeda (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 470 days.

(21) Appl. No.: 10/545,092

(22) PCT Filed: Feb. 12, 2004

(86) PCT No.: PCT/JP2004/001480

§ 371 (c)(1),
(2), (4) Date: Aug. 9, 2005

(87) PCT Pub. No.: WO2004/071951

PCT Pub. Date: Aug. 26, 2004

(65) Prior Publication Data

US 2006/0150509 A1 Jul. 13, 2006

(30) Foreign Application Priority Data

Feb. 14, 2003 (JP) .............................. 2003-036591

(51) Int. Cl.
| | | |
|---|---|---|
| *B01J 8/00* | (2006.01) | |
| *B01J 7/00* | (2006.01) | |
| *B01J 19/00* | (2006.01) | |
| *C01B 3/36* | (2006.01) | |
| *H01M 8/18* | (2006.01) | |
| *H01M 8/00* | (2006.01) | |
| *F28F 3/00* | (2006.01) | |

(52) U.S. Cl. .................... 48/127.9; 48/61; 48/197 R; 422/198; 422/189; 429/20; 429/12; 429/17; 165/166

(58) Field of Classification Search .................. 48/61, 48/127.9, 197 R; 422/198, 189; 429/20, 429/12, 17; 165/166
See application file for complete search history.

(56) References Cited

U.S. PATENT DOCUMENTS 5,043,232 A    8/1991    Landau et al.

(Continued)

FOREIGN PATENT DOCUMENTS

JP    3108269    9/1995

(Continued)

OTHER PUBLICATIONS

PCT International Search Report dated May 25, 2004.

*Primary Examiner*—Walter D. Griffin
*Assistant Examiner*—Lessanework T Seifu
(74) *Attorney, Agent, or Firm*—Dickinson Wright, PLLC

(57) ABSTRACT

A body of a hydrogen generator includes a reformer configured to generate a reformed gas mainly containing hydrogen, a material passage configured to supply a reforming material, which is a material for a reforming reaction, to the reformer, a shifter configured to convert CO contained in a reformed gas obtained from the reformer into $CO_2$, a reformed gas passage configured to supply the reformed gas obtained from the reformer to the shifter, and a passage for the shifted gas obtained from the shifter. The shifted gas passage and the material passage are adjacent to each other with a shared horizontal wall interposed therebetween, and thereby, heat from the shifted gas and radiant heat from the downstream end face of the shifter are transferred to the reforming material that travels in the material passage.

26 Claims, 5 Drawing Sheets

U.S. PATENT DOCUMENTS

| | | |
|---|---|---|
| 6,814,944 B1 | 11/2004 | Matsui et al. |
| 7,273,505 B2 * | 9/2007 | Suzuki et al. ............. 48/127.9 |
| 2001/0029735 A1 | 10/2001 | Miura et al. |
| 2002/0042035 A1 * | 4/2002 | Komiya et al. ............. 431/268 |
| 2002/0141924 A1 | 10/2002 | Ishikawa |
| 2003/0003033 A1 * | 1/2003 | Taguchi et al. ............. 422/198 |

FOREIGN PATENT DOCUMENTS

| | | |
|---|---|---|
| JP | 2669271 | 7/1997 |
| JP | 10338501 | 12/1998 |
| JP | 11255501 | 9/1999 |
| JP | 2000086203 | 3/2000 |
| JP | 2000285940 | 10/2000 |
| JP | 2002187705 | 7/2002 |
| JP | 2002274810 | 9/2002 |
| JP | 2002293506 | 10/2002 |
| JP | 2003160306 | 6/2003 |
| JP | 2003187849 | 7/2003 |
| JP | 2003252604 | 9/2003 |
| JP | 3482367 | 10/2003 |
| WO | 0063114 | 10/2000 |
| WO | 0147801 | 7/2001 |

* cited by examiner

HYDROGEN GENERATOR AND FUEL CELL POWER GENERATION SYSTEM

TECHNICAL FIELD

The present invention relates to a hydrogen generator that generates a reformed gas mainly containing hydrogen by reforming a hydrocarbon-based feed gas such as town gas and LP gas using steam (hereinafter referred to as "steam reforming"), and to a fuel cell system provided with the hydrogen generator.

BACKGROUND ART

A hydrogen generator that generates a reformed gas mainly containing hydrogen by steam-reforming of a hydrocarbon-based feed gas such as town gas and LP gas is used for, for example, producing hydrogen that is used as a feed gas in a fuel cell. Since the steam reforming reaction (hereinafter simply referred to as "reforming reaction") in the hydrogen generator is an endothermic reaction, it is necessary to keep a reformer at a temperature of about 550° C. to 800° C. in order to maintain the reforming reaction. For this reason, in the hydrogen generator, a heating source such as a burner is installed, and a high-temperature combustion gas obtained from the heating source, a radiant body that emits the radiant heat of the combustion gas, or the like, is utilized to heat the reformer.

Meanwhile, the reformed gas obtained with the reformer of the hydrogen generator mainly contains hydrogen, as mentioned above, but also contains CO as a byproduct produced in the reforming reaction. If such a reformed gas containing CO is directly supplied to the fuel cell, the CO reduces the reactivity of catalysts in the fuel cell. For this reason, in order to remove CO, a shifter that converts CO contained in the reformed gas into $CO_2$ through a shift reaction is disposed downstream of the reformer in the hydrogen generator.

As a conventional hydrogen generator, there is one in which a heat insulator is arranged along the outer circumference of a wall surface of a reformer, and a shifter is arranged so as to surround the reformer with the heat insulator interposed therebetween so as to inhibit heat from dissipating to outside from the reformer that is heated to a high temperature as described above (for example, cf. Japanese Patent. No. 3108269 (pp. 2-4, FIG. 3)). In addition, there is a hydrogen generator having a configuration in which a plurality of cylindrical units are concentrically arranged upright, a reformer is formed by filling a reforming catalyst into one of the cylinder-shaped clearance spaces formed by wall surfaces of the cylindrical units, and a shifter is formed by filling a CO shifting catalyst into a clearance space that is located on the outer circumference of the reformer; in such a configuration, the circumference of the reformer is covered by the shifter which is kept at a lower temperature (about 180° C. to 400° C.) than that of the reformer, and consequently, heat transfers from the reformer to the shifter. As a result, it is possible to decrease heat dissipation to outside (for example, cf. Japanese Laid-Open Patent Application Publication No. 2002-187705 (pp. 5-10, FIG. 1)).

However, in the hydrogen generators with the above-described configurations, heat transfers mainly from the reformer to the shifter since the reformer is higher in temperature than the shifter, and meanwhile, the heat dissipating from the shifter substantially does not transfer to the reformer. Thus, the heat that has dissipated from the shifter cannot be utilized effectively by returning it to the reformer, and as a result, sufficiently high thermal efficiency cannot be attained.

DISCLOSURE OF THE INVENTION

In view of such problems in conventional hydrogen generators, it is an object of the present invention to provide a hydrogen generator in which thermal efficiency is improved, and a fuel cell system comprising the hydrogen generator.

In order to achieve the foregoing and other objects, the present invention provides a hydrogen generator comprising a reformer configured to generate a reformed gas many containing hydrogen from a material through a reforming reaction, a material passage configured to supply the material to the reformer, a shifter configured to convert carbon monoxide in the reformed gas into carbon dioxide, a reformed gas passage configured to supply the reformed gas from the reformer to the shifter, and a shifted gas passage configured to take out a shifted gas obtained from the shifter, the hydrogen generator being configured to perform heat exchange between the shifted gas passage and the material passage.

In such a configuration, the temperature of the shifted gas passage side is kept at about 180° C. to 400° C., while the temperature of the material passage side is kept at about 110° C. to 120° C. Accordingly, here, heat transfers from the shifted gas passage side to the material passage side, and by the just-noted heat, the material traveling inside the material passage is heated. In this way, this configuration makes it possible to utilize the heat of the reformed gas shifter, which has not been effectively utilized sufficiently in the past, for heating the material, and therefore can improve thermal efficiency.

A heat generating portion of the shifter may configured to face a wall portion of the shifted gas passage with a space interposed therebetween. Or, heat retained by a shifted gas obtained from the shifter may be supplied to the material gas passage via the shifted gas passage.

It is preferable that the material passage be arranged more inward of the hydrogen generator than the shifted gas passage.

With such a configuration, heat transfers from the shifted gas passage towards the interior of the hydrogen generator, and therefore, it becomes possible to trap the heat generated by the shift reaction in the shifter into the interior of the hydrogen generator.

It is also possible to employ a configuration wherein: an interior of a body of the hydrogen generator is partitioned by a plurality of axially-directed walls sharing a central axis and arranged opposing to one another at predetermined gaps, and by a plurality of radially-directed walls arranged at a predetermined end portion of the axially-directed walls so as to intersect with the axially-directed walls, so that the material passage, the reformed gas passage, and the shifted gas passage are formed in the body, the reformer is formed along the central axis, and the shifter is formed in the axial direction side of the reformer; the material passage is arranged so as to surround an outer side of the reformer, one end portion thereof is connected to one end face of the reformer in the axial direction, and at least a portion thereof is formed along one end face of the reformer in the axial direction; the reformed gas passage is arranged so as to surround an outer circumference of the reformer, one end portion thereof is connected to the other end face of the reformer in the axial direction, and another end portion thereof is connected to an upstream face of the shifter, the shifter is arranged so as to oppose the one end face of the reformer in the axial direction with the material passage interposed therebetween; and the shifted gas passage is connected to a downstream end face of the shifter at one end portion thereof, and between the shifter and the reformer opposing each other, the shifted gas passage is directly or indirectly in contact with a portion of the material passage that is along the end face of the reformer.

With such a configuration, it is possible to realize a configuration in which the shifter is arranged so as to oppose an end face of the reformer at the axial direction side of the reformer, and the shifted gas passage connected to the shifter and the material passage connected to the end face of the reformer are adjacent to each other. Moreover, with such a configuration, the shifted gas is discharged toward the reformer side arranged inward of the hydrogen generator, therefore, it becomes possible to trap the heat obtained through the shift reaction within the interior of the hydrogen generator.

It is also possible to employ a configuration wherein: an interior of a body of the hydrogen generator is partitioned by a plurality of axially-directed walls sharing a central axis and arranged opposing to one another at predetermined gaps, and by a plurality of radially-directed walls arranged at a predetermined end portion of the axially-directed walls so as to intersect with the axially-directed walls, so that the material passage, the reformed gas passage, and the shifted gas passage are formed in the body, the reformer is formed along the central axis, and the shifter is formed so as to surround an outer side of the reformer in the axial direction; the material passage is arranged so as to surround an outer side of the reformer, and one end portion thereof is connected to one end face of the reformer in the axial direction; the reformed gas passage is arranged so as to surround an outer side of the material passage in the axial direction, one end portion thereof is connected to the other end face of the reformer in the axial direction, and the other end portion thereof is connected to an upstream face of the shifter, the shifter is positioned between the reformed gas passage and the material passage and is arranged so as to surround the material passage in the axial direction; and the shifted gas passage is connected to a downstream end face of the shifter at one end portion thereof, the shifted gas passage is directly or indirectly in contact with the material passage between the shifter and the reformer, and the shifted gas passage surrounds an outer side of the material passage in the axial direction.

With such a configuration, it is possible to realize a configuration in which the shifter is arranged so as to surround the outer side of the reformer with the material passage interposed therebetween, and the shifted gas passage connected to the shifter is adjacent to the material passage. Moreover, with such a configuration, the shifted gas is discharged toward the reformer arranged inward of the hydrogen generator, therefore, it becomes possible to trap the heat obtained through the shift reaction within the interior of the hydrogen generator.

It is preferable that the configuration is such that the shifted gas is blown out from the downstream end face of the shifter into the shifted gas passage so as to collide with, at the portion where the shifted gas passage and the material passage are in contact, a partition wall that partitions both of the passages, and thereafter, the shifted gas travels along the shifted gas passage.

With such a configuration, since the blowing direction of the shifted gas intersects with the traveling direction of the material traveling in the material passage, no heat transfer laminar film forms when heat transfers from the shifted gas passage side to the material passage side; consequently, it becomes possible to perform heat exchange more effectively.

It is preferable that, in the shifter, a gas traveling direction from the upstream face toward the downstream end face is substantially a vertical direction.

With such a configuration, gas travels along substantially a vertical direction in the shifter, and therefore, due to the effect of buoyancy, a uniform radiant face is formed on the downstream end face of the shifter and the traveling of the gas is accelerated. Therefore, effective heat exchange becomes possible.

The material may contain a hydrocarbon-based feed gas and water, and the material passage may comprise a passage portion in which the feed gas and water travel in different phase states, a water evaporator configured to evaporate the water to produce steam, and a feed gas mixture passage portion in which a gas mixture of the feed gas and the steam travels; and the material passage that is directly or indirectly in contact with the shifted gas passage may be any of: the feed gas mixture passage portion; the passage portion in which the feed gas and water travel in different phase states; the feed gas passage portion; and the water passage portion.

The shifter may such that a platinum group metal serving as a shift catalyst is carried on a carrier composed of a metal oxide containing at least one selected from Al, Ce, and Zr.

In such a configuration, since the carrier is composed of a metal oxide containing Al, Ce, or Zr, the heat resistance of the shifter further improves. Consequently, the temperature of the shifter can be further increased. As a result, the amount of heat supplied from the shifted gas passage side is increased, and the advantageous effects attained by the present invention are exhibited more effectively.

It is possible to employ a configuration in which heat exchange is performed between the reformed gas passage and the material passage.

With such a configuration, heat is supplied from the shifted gas passage to the material passage, and heat is also supplied from the reformed gas passage to the material passage. Therefore, it is possible to achieve a further improvement in thermal efficiency. In particular, since heat supply is made possible from the reformer that is kept at a high temperature of about 550° C. to 800° C., the material in the material passage can be effectively heated. Moreover, by giving heat retained by the reformed gas to the material, the temperature of the reformed gas can be controlled to an optimum reaction temperature in the shifter.

The fuel cell system according to the present invention comprises a hydrogen generator having any one of the foregoing configurations; and a fuel cell configured to generate power using a fuel gas and an oxidizing gas, the fuel gas containing hydrogen as its main component and being supplied from the hydrogen generator.

With such a configuration, an improvement in thermal efficiency is achieved in the hydrogen generator as described above, and therefore, it becomes possible to realize a fuel cell system in which thermal efficiency is improved as a whole.

The foregoing and other objects, features and advantages of the present invention will become more readily apparent from the following detailed description of preferred embodiments of the invention with reference to the accompanying drawings.

BEST MODE FOR CARRYING OUT THE INVENTION

Hereinbelow, preferred embodiments of the present invention are described with reference to the drawings. It should be noted that the drawings show characteristic configurations of hydrogen generators and fuel cell systems provided with the hydrogen generators according to the embodiments, and the graphical representations and detailed explanations of the configurations that have been known conventionally will be omitted.

Embodiment 1

Hydrogen Generator

Figure 1:
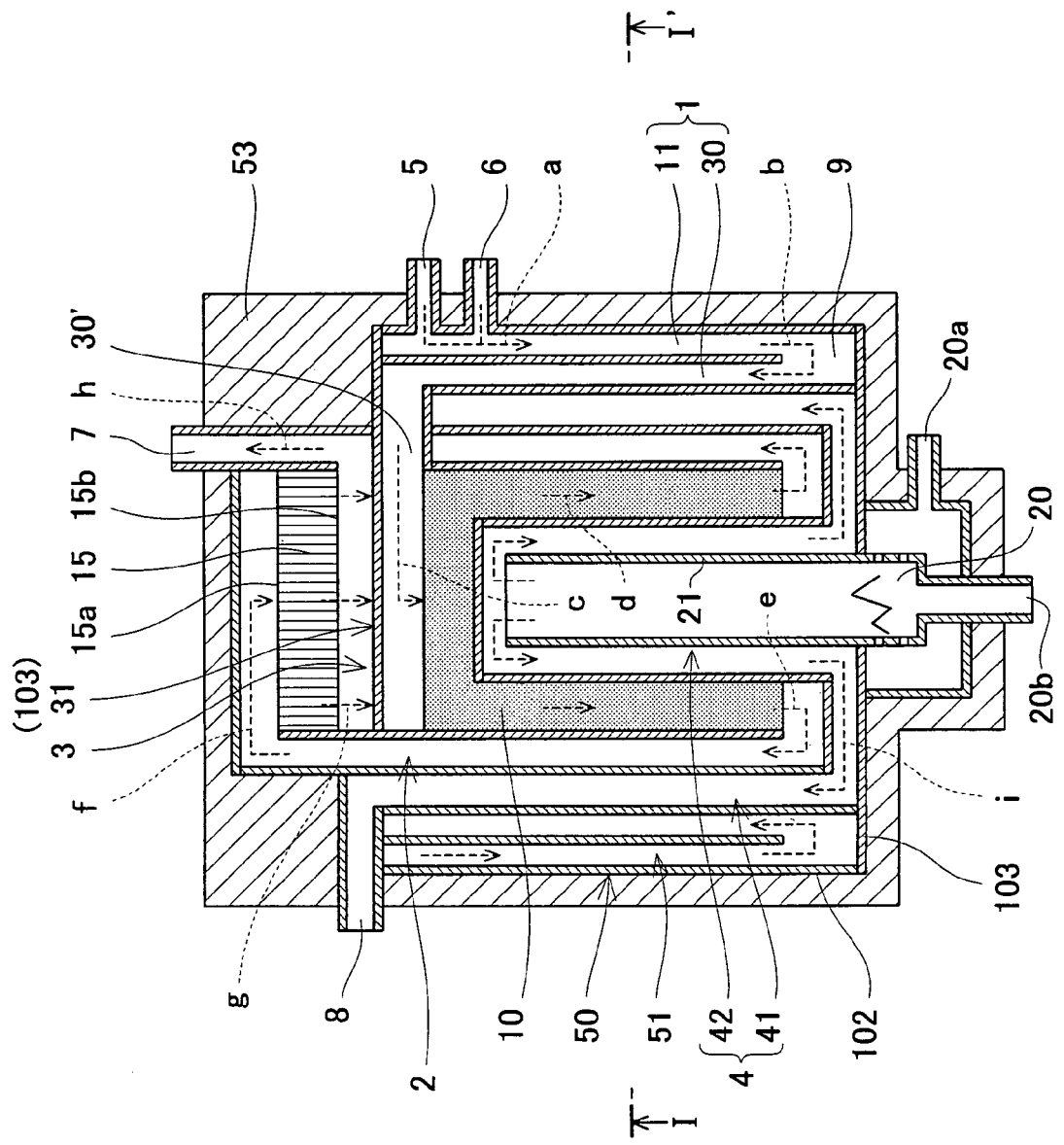
FIG. 1 is a schematic cross-sectional view illustrating the configuration of a hydrogen generator according to Embodiment 1 of the present invention.

FIG. 1 is a cross-sectional view schematically illustrating the configuration of a hydrogen generator according to Embodiment 1 of the present invention.

As shown in FIG. 1, the hydrogen generator mainly comprises a cylindrical-shaped body 50 the upper and lower ends of which are closed, a burner 20 to which a tubular-shaped radiant cylinder 21 is attached, and a heat insulator 53 that covers the outer circumference of the body 50. Hereinbelow, the structure of the hydrogen generator is described in detail.

The burner 20, to which the radiant cylinder 21 is attached, is accommodated and arranged at the center of the body 50 so that its central axis matches that of the body 50. The inside of the cylindrical-shaped body 50, specifically, the space between the inner wall of the body 50 and the radiant cylinder 21, is partitioned by a plurality of tubular-shaped concentric vertical walls 102 that have various different radii and axial lengths, and a plurality of disk-shaped or hollow disk-shaped horizontal walls 103 that are disposed as appropriate at predetermined end portions of the vertical walls 102. Specifically, the plurality of vertical walls 102 is concentrically arranged upright inside the body 50 to form a clearance space 51 between the vertical walls 102, and, a predetermined end portion of the vertical walls 102 is closed as appropriate by the horizontal walls 103 so that desired gas passages are formed utilizing the clearance space 51. Thereby, a reformer 10, a shifter 15, and various gas passages are formed in the interior of the body 50.

The gas passages are formed to have ring shape within the cross section I-I' along a radial direction of the body 50, and upstream passages 11, 30 of a material passage 1 having a double structure, a downstream passage 41 of a combustion gas passage 4 having a double structure, a reformed gas passage 2, the reformer 10, and an upstream passage 42 of the combustion gas passage 4 are disposed in that order from the outer side toward the inner side.

The reformer 10 has a cylinder-like shape, and is arranged so as to surround the side part and the top part of the radiant cylinder 21 with the upstream passage 42 of the combustion gas passage 4 interposed therebetween. A downstream passage 30' of the material passage 1 is formed axially upward of the reformer 10, along the upper end face of the reformer 10 by a horizontal wall 103 (hereinafter this horizontal wall 103 is specifically referred to as "horizontal wall 31"). A shifter 15 is disposed further axially upward from the reformer 10 on top of the horizontal wall 31 so as to oppose the upper end face of the reformer 10. By the horizontal wall 31 and a downstream end face 15b of the shifter 15, a shifted gas passage 3 is formed. Here, the shifter 15 and the reformer 10 are arranged opposed to each other and the clearance space between them is partitioned by the horizontal wall 31 as described above, whereby the above-mentioned downstream passage 30' and a shifted gas passage 3, formed so as to sandwich the horizontal wall 31 therebetween, are directly in contact with each other with the horizontal wall 31 interposed therebetween.

The body 50 having the above-described configuration is provided with: a material inlet 5 and a water inlet 6 of the material passage 1; a gas outlet 7 of the shifted gas passage 3; and an exhaust gas outlet 8 of the combustion gas passage 4, all of which communicate with the outside of the hydrogen generator. Also, the burner 20 attached to the body 50 is provided with an air inlet 20a and a fuel inlet 20b.

With the combustion gas passage 4, an end portion of the upstream passage 42 is connected to the burner 20, to which the radiant cylinder 21 is attached, and an end portion of the downstream passage 41 is connected to outside through the exhaust gas outlet 8. Also, with the material passage 1, an end portion of the upstream passage 11 is connected to outside through the material inlet 5 and the water inlet 6, and an end portion of the downstream passage 30 (30') is connected to the upper end face of the reformer 10. Furthermore, with the reformed gas passage 2; its upstream end portion is connected to a lower end face of the reformer 10, and its downstream end portion is connected to an upstream end face 15a of the shifter 15. Also, the upstream end portion of the shifted gas passage 3 is connected to a downstream end face 15b of the shifter 15, and the downstream end portion is connected to outside through the shifted gas outlet 7.

The reformer 10 is formed in a manner that one in which a platinum group metal serving as a reforming catalyst is carried on a carrier made of a metal oxide shaped into a granular form is filled into the clearance space 51 formed between the vertical walls 102. Thus, the reformer 10 is formed more inward than the material passage 1 and the reformed gas passage 2 in the hydrogen generator, and its upper end face is connected to the material passage 1 while its lower end face is connected to the reformed gas passage 2.

The shifter 15 has a configuration such that a platinum group metal serving as a shift catalyst is dispersed and carried on a carrier composed of a film-state metal oxide formed on a ceramic honeycomb substrate.

The outer circumference of the body 50 and the burner 20 is covered with a heat insulator 53 except for the areas of the material inlet 5, the water inlet 6, the shifted gas outlet 7, the combustion exhaust gas outlet 8, the air inlet 20a, and the fuel inlet 20b, which communicate with outside.

Next, the operation of the above-described hydrogen generator is described.

A fuel gas is supplied to the burner 20 through the fuel inlet 20b, and air is supplied to the burner 20 through the air inlet 20a. Here, as will be described later with FIG. 5, an excessive fuel (so-called off gas) obtained in the fuel cell system is used as a fuel gas. Then, using the fuel gas and the air supplied, diffusion combustion is performed. Here, since the burner 20 is surrounded by the radiant cylinder 21, the just-noted combustion is performed within the radiant cylinder 21, by which a high-temperature combustion gas is produced. The heat of the combustion gas is transferred radially outward with respect to the body 50 through the radiant cylinder 21 by radiation. Such radiant heat heats up the reforming catalyst of the reformer 10, and at the same time, the combustion gas travels axially upward in the radiant cylinder 21, directly beating up the reforming catalyst. Thereby, the reformer 10 is kept at a temperature in the range of about 550° C. to 800° C. The combustion gas that has ascended travels axially downward through the upstream passage 42 of the combustion gas passage 4 along a vertical wall 102, further travels axially upward through the downstream passage 41, and is finally discharged outside from the combustion exhaust gas outlet 8 (arrow i in the figure). Here, as will be described later, heat exchange takes place between the heat retained by the combustion gas and the water traveling through the material passage 1 during the process in which the combustion gas travels through the combustion gas passage 4, and the heat of the combustion gas is utilized as latent heat of vaporization in an water evaporator 9.

A feed gas containing a compound comprising at least carbon and hydrogen (for example, hydrocarbon gas such as town gas or LP gas, or alcohol such as methanol), which is supplied from the material inlet 5, and water, which is supplied from the water inlet 6, are sent through the material passage 1 to the reformer 10, as a material. Here, first, the feed gas and the water supplied from respective supply ports 5 and 6 travel axially downward through the upstream passage 11 of the material passage 1 along the vertical walls 102 (arrow a in the figure) in different phase states (i.e., gas and liquid). Then, in the water evaporator 9 positioned at a bottom portion of the passage 11, water evaporates utilizing the heat retained by the combustion gas and the radiant heat as well as the later-described heat from the reformer 10, and turns into steam. Further, a mixture of the steam and the above-noted feed gas (hereafter this mixture is referred to as a "feed gas mixture") travels axially upward through the upstream passage 30 along the vertical walls 102 (arrow b in the figure). Then, the feed gas mixture enters a downstream passage 30' of the material passage 1, which is formed along the upper end face of the reformer 10, then travels through the passage 30' radially inward of the body along the horizontal wall 31, and is subsequently supplied into the reformer 10 (arrow c in the figure). The temperature of the feed gas mixture in such a supply process is about 110° C. to 120° C. Herein, the downstream passage 30' of the material passage 1 through which the feed gas mixture travels as described above is specifically referred to as a feed gas mixture passage portion 30'.

The feed gas mixture is introduced from the upper end face of the reformer 10 into the interior thereof, and travels axially downward through the reforming catalyst along the vertical walls 102 (arrow d in the figure). During this travel, the feed gas mixture is heated and its temperature is elevated, whereby a reforming reaction is performed, generating a reformed gas. The reformed gas mainly contains hydrogen and also contains CO produced as a byproduct. The generated reformed gas is discharged from the lower end face of the reformer 10 to the reformed gas passage 2, and travels axially upward through the passage along the vertical walls 102 (arrow e in the figure). Then, it travels in radial directions along the horizontal wall 103 through the passage and reaches the shifter 15 (arrow f in the figure).

The reformed gas supplied onto the upstream end face 15a of the shifter 15 travels axially (in a vertical direction) downward through the shift catalyst of the shifter 15. In this process, a reaction by which the CO contained in the reformed gas is converted into $CO_2$, i.e., a shift reaction, is performed, whereby a shifted gas is produced. The shifted gas is blown vertically downward from the downstream end face 15b of the shifter 15 into the shifted gas passage 3 (arrow g in the figure), and collides with the bottom face of the passage 3, that is, the horizontal wall 31 shared with the feed gas mixture passage portion 30' Thereafter, the shifted gas travels in radial directions along the horizontal wall 103 through the passage, then travels axially upward through the passage along the vertical walls 102, and is taken out from the gas outlet 7 (arrow h in the figure).

[Fuel Cell System]

Figure 5:
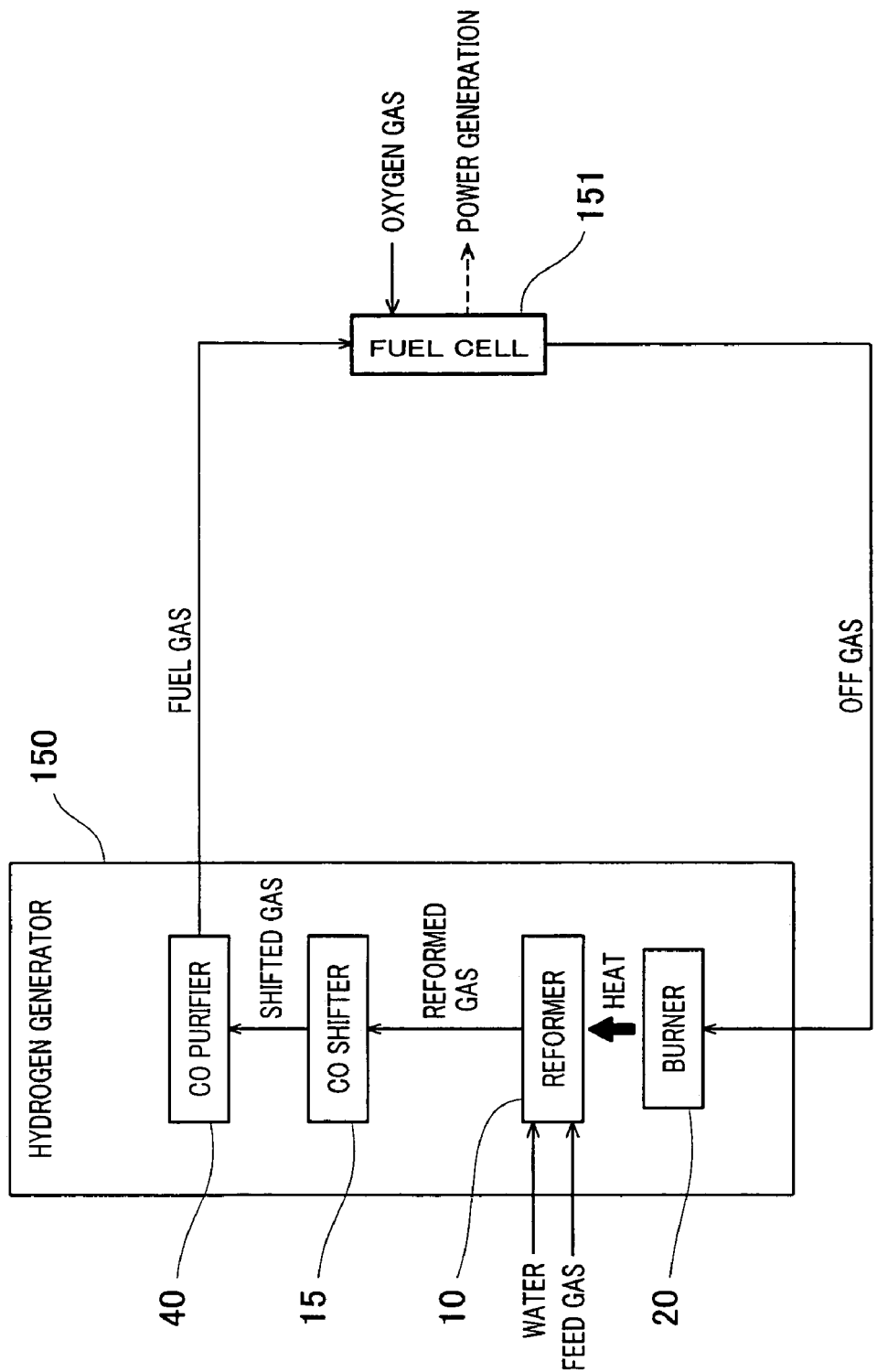
FIG. 5 is a schematic configuration view of a fuel cell system according to Embodiment 1 of the present invention.

FIG. 5 is a schematic configuration view of a fuel cell system according to the present embodiment, which is provided with a hydrogen generator as shown in FIG. 1.

This fuel cell system comprises the hydrogen generator 150 shown in FIG. 1 and a fuel cell 151. Here, in the hydrogen generator 150, a CO purifier 40 is provided downstream of the shifter 15. The CO concentration in the shifted gas obtained from the shifter 15 is reduced to between $1/5$ and $1/50$ of the CO concentration in the reformed gas, according to the temperature of the shift reaction. Nevertheless, it is necessary that the CO concentration in a fuel gas supplied to the fuel cell is reduced to 10 ppm or less. Therefore, the shifted gas is further processed by being supplied to the CO purifier 40 arranged downstream of the shifter 15. Then, the gas obtained by the hydrogen generator 150, which mainly contains hydrogen, is supplied to the anode of the fuel cell 151 as a fuel gas. In the fuel cell 151, power generation is performed utilizing a reaction between the fuel gas supplied to the anode and an oxygen gas supplied to the cathode. Then, the fuel gas that has not been used in the reaction is supplied as an off gas to the burner of the hydrogen generator, where it is burnt.

As described above, according to the present embodiment, heat is generated in the shifter 15 accompanying the shift reaction since the shift reaction is an exothermic reaction, forming a heat generating portion in the shifter 15. In addition, the reformed gas supplied to the shifter itself retains heat. Therefore, the temperature of the shifter 15 and of the shifted gas is kept at a temperature of about 180° C. to 400° C. In particular, because the shift reaction, which is an exothermic reaction, is performed as described above, the temperature of the shifter 15 is higher at the downstream end face 15b than at the upstream end face 15a.

In the present embodiment, the shifted gas passage 3 arranged on the downstream end face 15b of the shifter 15 is directly in contact with the feed gas mixture passage portion 30' via the horizontal wall 31, and moreover, as described above, the temperature of the feed gas mixture that flows through the feed gas mixture passage portion 30' is about 110° C. to 120° C. while the temperature of the shifted gas that flows through the shifted gas passage 3 is about 180° C. to 400° C. Consequently, heat transfers from the shifted gas to the feed gas mixture via the horizontal wall 31, to perform heat exchange. In such a heat exchange, the shifted gas forms such a stream as to collide with the horizontal wall 31 as described above, and therefore, no heat transfer laminar film is formed in the vicinity of the horizontal wall 31; as a consequence, a higher heat exchange efficiency can be obtained in comparison with the case in which the shifted gas forms a counter flow or a parallel flow which does not collide with the horizontal wall 31.

Moreover, in addition to the heat retained by the shifted gas, the radiant heat from the shifter 15 is supplied to the feed gas mixture through the shifted gas passage 3. Here, since the gas flow direction in the shifter 15 is directed vertically downward, a uniform radiant face is formed on the downstream end face 15b of the shifter 15 due to the effect of buoyancy. For this reason, in the shifter 15, radiant heat uniformly dissipates from the downstream end face 15b, which has a higher temperature than the upstream end face 15a as described above, and heat is effectively supplied to the feed gas mixture through the horizontal wall 31.

Thus, the hydrogen generator of the present embodiment makes it possible to perform heat recovery by utilizing the heat from the reformer 10 for evaporating water and heating the feed gas mixture, and moreover, to perform heat recovery by utilizing the heat retained by the shifted gas obtained from the shifter 15 and the radiant heat of the shifter 15 for heating the feed gas mixture. Therefore, the present embodiment achieves an improvement in a heat recovery amount over conventional cases.

Furthermore, such a configuration also attains the effect of trapping the heat generated by the shift reaction within the interior of the hydrogen generator, because the shifted gas is discharged toward the reformer 10 arranged inside the hydrogen generator. Thus, since an efficient heat recovery becomes possible with the hydrogen generator, the use of the hydrogen generator for a fuel cell system makes it possible to achieve an improvement in thermal efficiency of the system as a whole.

Here, in the foregoing, the reformer 10 has a configuration in which a platinum group metal is carried on a carrier of a metal oxide shaped into a granular form, as described above, but the configuration of the reformer 10 may be other than this configuration. For example, depending on the shape of the reformer 10, such a configuration is also possible that a platinum group metal is dispersed on a carrier made of a film-state metal oxide formed on a honeycomb substrate of ceramic, metal, or the like.

Furthermore, in the foregoing, the shifter 15 has a configuration in which a platinum group metal is dispersed and carried on a film-state metal oxide carrier formed on a ceramic honeycomb substrate, but the configuration of the shifter 15 may be other than this configuration. For example, the substrate may be a structure constructed by a metallic thin plate of stainless steel or the like; moreover, such a configuration is possible that, depending on the shape of the shifter 15, a platinum group metal carried on a carrier of a metal oxide shaped into a granular form is filled. Further, as the shift catalyst of the shifter 15, a base metal such as a Cu—Zn type metal may be used other than the platinum group metal. It should be noted that the catalyst has a higher heat resistance when a platinum group metal is used as the catalyst, as in the present embodiment, than when a base metal is used as the catalyst, and consequently, the temperature of the shifter 15 can be made higher. Therefore, the temperature difference becomes greater between the feed gas mixture and the shifter 15 and between the feed gas mixture and the shifted gas, and consequently, the heat recovery amount from the shifter 15 and the shifted gas to the feed gas mixture becomes greater.

Moreover, the present embodiment has a configuration in which the shifter 15 is arranged axially above the burner 20 and the surrounding reformer 10; however, as a modified example of the present embodiment, such a configuration is possible in which axial positions of the shifter 15 and the reformer 10 are reversed, in other words, the burner 20 and the reformer 10 are arranged axially above the shifter 15. With such a configuration, the speed at which the shifted gas collides with the horizontal wall 31 increases due to the effect of buoyancy, making it possible to perform heat exchange more efficiently.

Embodiment 2

Hydrogen Generator

Figure 2:
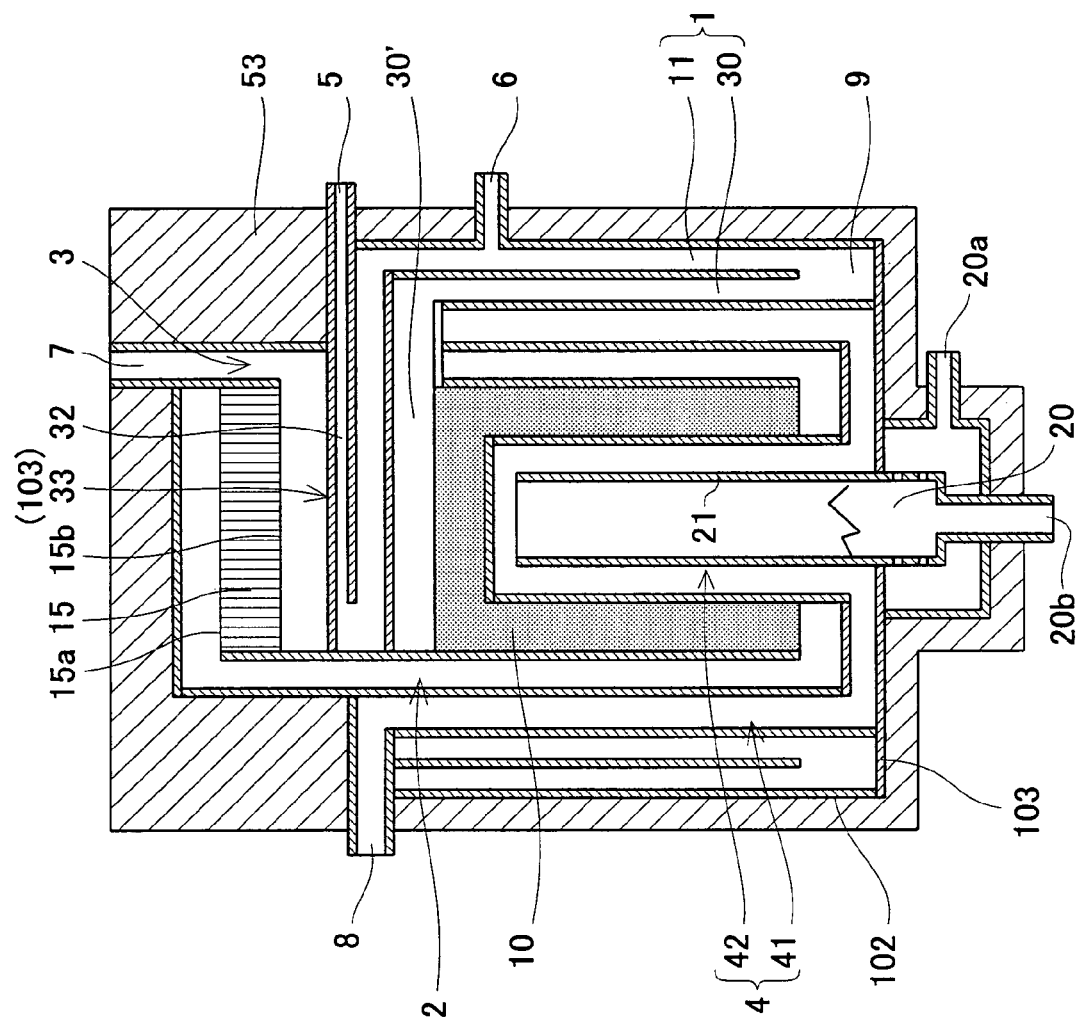
FIG. 2 is a schematic cross-sectional view illustrating the configuration of a hydrogen generator according to Embodiment 2 of the present invention.

FIG. 2 is a cross-sectional view schematically illustrating the configuration of a hydrogen generator according to Embodiment 2 of the present invention. The hydrogen generator of the present embodiment has a similar configuration to that of the hydrogen generator of Embodiment 1, but it differs from Embodiment 1 in the following points.

Embodiment 1 has a configuration in which the feed gas mixture passage portion 30' located further downstream from the water evaporator 9, that is, a region through which a mixture of steam and feed gas flows, is arranged so as to be adjacent to the shifted gas passage 3; in contrast, in the present embodiment, a region of the material passage 1 that is further upstream from the water inlet 6, that is, a region through which only feed gas flows (hereafter this region is referred to as a "feed gas passage portion 32") is arranged so as to be adjacent to the shift gas passage 3 with a shared horizontal wall 33 interposed therebetween.

Specifically, in the present embodiment, the upstream passage 11 of the material passage 1 includes the feed gas passage portion 32, which is partitioned by a horizontal wall 103 and arranged axially above the feed gas mixture passage portion 30' so as to oppose the passage portion 30'. In addition, the feed gas passage portion 32 is directly in contact with the shifted gas passage 3 with the horizontal wall 33 interposed therebetween. The downstream of the feed gas passage portion 32 has the same configuration as that of Embodiment 1.

In such a configuration, the feed gas that has been supplied from the material inlet 5 travels in radial directions along the horizontal wall 103 through the feed gas passage portion 32, and thereafter travels axially downward along the vertical walls 102 through the upstream passage 11 of the material passage 1. Meanwhile, water is supplied from the water inlet 6 in a region further downstream from the feed gas passage portion 32, and the water is turned into steam at the water evaporator 9 and is mixed with a feed gas in a similar manner to that in Embodiment 1. The feed gas mixture, in which the steam and the feed gas are mixed, flows through the interior of the feed gas mixture passage 30 of the material passage 1 in a similar manner to that in Embodiment 1 and is guided to the reformer 10.

Here, between the shifted gas and the feed gas flowing through the respective passages in the shifted gas passage 3 and the feed gas passage portion 32 that are adjacent to each other as in the present embodiment, the shifted gas has a higher temperature than the feed gas. Consequently, the heat retained by the shifted gas and the radiant heat from the shifter 15 are transferred to the feed gas flowing through the feed gas passage portion 32 via the shared horizontal wall 33, and utilized for heating the feed gas. In such a heat exchange between the shifted gas and the feed gas, the shifted gas forms such a stream as to collide with the horizontal wall 33 shared with the feed gas passage portion 32, as in the case of Embodiment 1, and therefore, as was described in the foregoing, it becomes possible to transfer heat to the feed gas efficiently. Moreover, in this case as well as in the case of Embodiment 1, a uniform radiant face is formed on the downstream end face 15b of the shifter 15 due to the effect of buoyancy, and the radiant heat is transferred from the downstream end face 15b, which has a higher temperature than the upstream end face 15a, to the feed gas effectively.

As described above, the hydrogen generator of the present embodiment makes it possible to perform heat recovery utilizing the heat of the shifted gas obtained from the shifter 15 for heating the feed gas. Accordingly, thermal efficiency is improved over conventional cases, as with Embodiment 1.

In the present embodiment as well as in Embodiment 1, the configurations of the shifter 15 and the reformer 10 are not limited to, but may be other than, the above-described configurations. In addition, as a modified example of the present embodiment, a configuration may be employed in which the vertical positions of the shifter 15 and the reformer 10 are reversed, like the modified example of Embodiment 1—In this case as well, the similar advantageous effects as the foregoing are attained.

[Fuel Cell System]

A fuel cell system according to the present embodiment is such that the fuel cell system of Embodiment 1 (FIG. 5) comprises the hydrogen generator of the present embodiment in place of the hydrogen generator of Embodiment 1. This makes it possible to construct a fuel cell system comprising a hydrogen generator that can achieve the foregoing advantageous effects.

Embodiment 3

Hydrogen Generator

Figure 3:
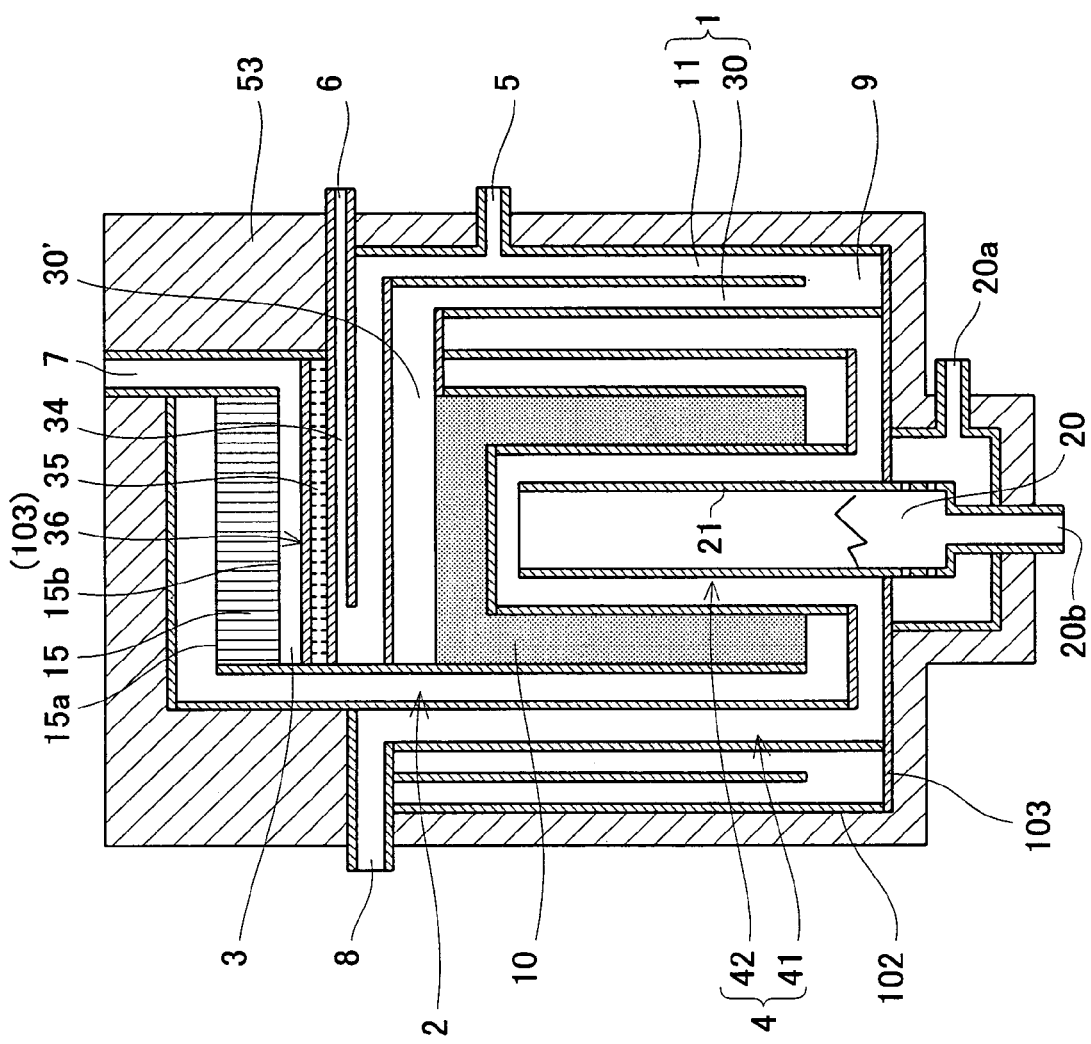
FIG. 3 is a schematic cross-sectional view illustrating the configuration of a hydrogen generator according to Embodiment 3 of the present invention.

FIG. 3 is a cross-sectional view schematically illustrating the configuration of a hydrogen generator according to Embodiment 3 of the present invention. The hydrogen generator of the present embodiment has a similar configuration to that of the hydrogen generator of Embodiment 1, but it differs from Embodiment 1 in the following points.

In the present embodiment, a region of the material passage 1 that is at the further upstream side from the material inlet 5, that is, a region though which only water flows (hereafter referred to as a "water passage portion 34") is arranged so as be indirectly adjacent to the shifted gas passage 3 with a heat transfer inhibiting structure 35 interposed therebetween. In addition, with the material passage 1 of the present embodiment, a feed gas is supplied from the material inlet 5 in a region further downstream from the water passage portion 34. The feed gas is mixed with steam generated by the water evaporator 9, and the resultant feed gas mixture is guided to the reformer 10 as in a similar manner to Embodiment 1.

Specifically, in the present embodiment, the upstream passage 11 of the material passage 1 includes the water passage portion 34, which is partitioned by a horizontal wall 103 and is arranged axially above the feed gas mixture passage portion 30' so as to oppose the passage portion 30'. In addition, the water passage portion 34 is indirectly in contact with the shifted gas passage 3 with the horizontal wall 36 and the heat transfer inhibiting structure 35 interposed therebetween. The configuration of the downstream of the water passage portion 34 is the same as that of Embodiment 1.

In such a configuration, water supplied from the water inlet 6 travels in radial directions along the horizontal wall 103 through the water passage portion 34, and thereafter, travels axially downward along the vertical walls 102 through the upstream passage 11 of the material passage 1. Meanwhile, a feed gas is supplied from the material inlet 5 in a region further downstream from the water passage portion 34. The water that has traveled through the passage turns into steam in the water evaporator 9 and is mixed with the feed gas in a similar manner to that in Embodiment 1. The feed gas mixture, in which the steam and the feed gas are mixed flows through the interior of the feed gas mixture passage portion 30' of the material passage 1 in a similar manner to that in Embodiment 1, and is guided to the reformer 10.

Here, between the shifted gas and the water in the shifted gas passage 3 and the water passage portion 34 that are indirectly adjacent to each other as in the present embodiment, the shifted gas has a higher temperature than the water. Therefore, the heat retained by the shifted gas and the radiant heat from the shifter 15 are transferred to the water flowing through the water passage portion 34 via the heat transfer inhibiting structure 35. In this case, the heat transferred from the shifter 15 side to the water passage portion 34 side is adjusted by the heat transfer inhibiting structure 35 to be a heat amount such as not to cause the water to evaporate. Examples of the heat transfer inhibiting structure 35 used include a heat insulator such as glass wool in which a metal having a higher thermal conductivity is dispersed and mixed, a space in which particles of ceramic or the like are filled, and a space in which a material that absorbs heat by a phase change and causes little temperature rise is filled.

In the heat exchange between the shifted gas and the water in the present embodiment, the shifted gas forms a stream such as to collide with the horizontal wall 36, which is the bottom face of the shifted gas passage 3, as in the case of Embodiment 1. This makes it possible to transfer heat to the water efficiently, as in Embodiment 1. Furthermore, as in the case of Embodiment 1, in the shifter 15, the radiant heat is transferred to the water effectively from the downstream end face 15b, which has a higher temperature than the upstream end face 15a, due to the effect of buoyancy.

As has been described above, the hydrogen generator of the present embodiment makes it possible to perform heat recovery utilizing the heat of the shifted gas obtained from the shifter 15 for heating water. Consequently, thermal efficiency is improved over conventional cases, as in Embodiment 1.

In the present embodiment as well as in Embodiment 1, the configurations of the shifter 15 and the reformer 10 are not limited to, but may be other than, the above-described configurations. In addition, as a modified example of the present embodiment, a configuration may be employed in which the vertical positions of the shifter 15 and the reformer 10 are reversed.

[Fuel Cell System]

A fuel cell system according to the present embodiment is such that the fuel cell system of Embodiment 1 (FIG. 5) comprises the hydrogen generator of the present embodiment in place of the hydrogen generator of Embodiment 1. This makes it possible to construct a fuel cell system comprising a hydrogen generator that can achieve the foregoing advantageous effects.

Embodiment 4

Hydrogen Generator

Figure 4:
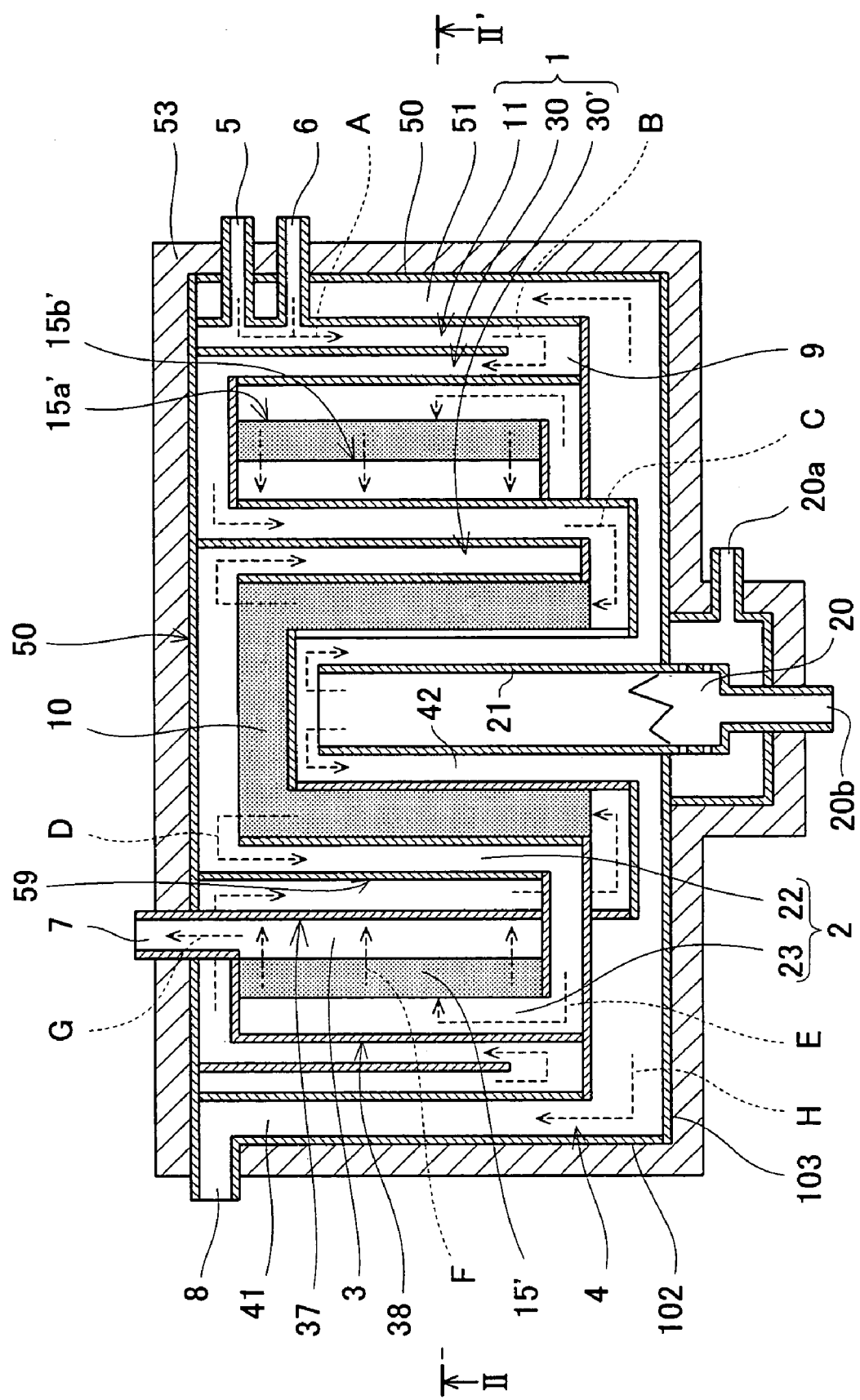
FIG. 4 is a schematic cross-sectional view illustrating the configuration of a hydrogen generator according to Embodiment 4 of the present invention.

FIG. 4 is a cross-sectional view schematically illustrating the configuration of a hydrogen generator according to Embodiment 4 of the present invention. The hydrogen generator of the present embodiment has similar constituting elements to those of the hydrogen generator of Embodiment 1, but its structure is different from Embodiment 1 in the following points.

Specifically, in Embodiment 1, the shifter 15 and the shifted gas passage 3 are arranged above the reformer 10 in the axial direction of the hydrogen generator; in contrast, in the present embodiment, a cylindrical-shaped shifter 15' and a shifted gas passage 3 are arranged in a radial direction of the hydrogen generator so as to surround the outer circumference of the reformer 10, and a feed gas mixture passage portion 30' of the material passage 1 is arranged between the reformer 10 and the shifted gas passage 3.

Specifically, in the present embodiment, the interior of a cylindrical-shaped body 50, the upper and lower ends of which are closed, is partitioned by vertical walls 102 and horizontal walls 103 in a similar manner to that in Embodiment 1, and thereby, a cylindrical-shaped reformer 10 is formed in the center of the hydrogen generator so as to surround a burner 20 to which a radiant cylinder 21 is attached. In addition, gas passages and a shifter 15', each of which has a cylindrical shape and a ring-like cross-sectional shape taken along line II-II' in a radial direction of the hydrogen generator, are formed so as to surround the reformer 10.

Here, a downstream passage 41 of a combustion gas passage 4 having a double structure, dual-structured upstream passages 11 and 30 of a material passage 1 having a triple structure, a downstream passage 23 of a reformed gas passage 2 having a double structure, a shifter 15', a shifted gas passage 3, a downstream passage 30' of the material passage 1, an upstream passage 22 of the reformed gas passage 2, a reformer 10, and an upstream passage 42 of a combustion gas passage 4 are formed in that order from the outer side toward the inner side in a radial direction of the hydrogen generator. The above-noted upstream passages and downstream passages of the passages having multiple structures are connected by passages formed by the horizontal walls 103 in a radial direction.

The above-described gas passages are as follows. As for the combustion gas passage 4, an end portion of the upstream passage 42 is connected to the burner 20, to which the radiant cylinder 21 is attached, and an end portion of the downstream passage 41 is connected to outside through an exhaust gas outlet 8. As for the material passage 1, an end portion of the upstream passage 11 is connected to outside through a material inlet 5 and a water inlet 6, and an end portion of the downstream passage 30' is connected to a lower end face of the reformer 10. In addition, as for the reformed gas passage 2, an end portion of the upstream passage 22 is connected to an upper end face of the reformer 10 and an end portion of the downstream passage 23 is connected to an upstream end face 15'a of the shifter 15'. In addition, as for the shifted gas passage 3, its upstream end portion is connected to a downstream end face 15'b of the shifter 15', and its downstream end portion is connected to outside through a shifted gas outlet 7.

In the present embodiment, the shifter 15' is unlike the shifter 15 of Embodiment 1, in which a platinum group metal is carried on a film-state metal oxide carrier formed on a honeycomb substrate, but is formed by arranging one in which a platinum group metal is carried on a metal oxide carrier shaped into a granular form, in a cylindrical-shaped region between the reformed gas passage 2 and the shifted gas passage 3.

In the present embodiment, a feed gas and water respectively supplied from the material inlet 5 and the water inlet 6 flow axially downward along the vertical walls 102 through the upstream passage 11, which is on the outer side of the material passage 1 (arrow A in the figure). Then, the water evaporates in a water evaporator 9 in a bottom portion of the passage, receiving heat from the reformer 10 and the combustion gas inside the combustion gas passage 4. The steam thus generated and the feed gas are mixed, forming a feed gas mixture, which flows axially upward along the vertical walls 102 through the upstream passage 30 (arrow B in the figure). Thereafter, it enters the downstream passage 30' and again flows axially downward along the vertical walls 102 through the passage. Here, the downstream passage 30' of the material passage 1 through which the feed gas mixture flows is specifically referred to as a feed gas mixture passage portion 30'. Through the feed gas mixture passage portion 30', the feed gas mixture is supplied from the lower end of the reformer 10 into the interior of the reformer 10 (arrow C in the figure). The feed gas mixture undergoes a reforming reaction in the process in which it flows axially upward along the vertical walls 102 through the reformer 10, producing a reformed gas mainly containing hydrogen.

The reformed gas thus produced flows axially downward along the vertical walls 102 through the upstream passage 22 of the reformed gas passage 2, further flows axially upward along the vertical walls 102 through the downstream passage 23 (arrow D and E in the figure), and reaches the shifter 15'. In the process in which the reformed gas flows as such, heat retained by the reformed gas is given to the feed gas mixture through a shared vertical wall 39 because the upstream passage 22 of the reformed gas passage 2 and the feed gas mixture passage portion 30' are adjacent to each other with the shared vertical wall 39 interposed therebetween. Meanwhile, the reformed gas supplied to the shifter 15' flows toward the inside of the body, in a radial direction of the cylindrical body-shaped shifter 15', that is, in a direction perpendicular to the central axis (not shown) of the hydrogen generator (arrow F in the figure). On this process, a shifted gas is produced through a shift reaction. Here, since the shift reaction is an exothermic reaction as previously mentioned, the temperature of a downstream end face (i.e., the inner circumferential face) 15'b of the shifter 15' becomes higher than that of an upstream end face (i.e., the outer circumferential face) 15'a thereof. The shifted gas obtained from the shifter 15' enters the shifted gas passage 3 from the downstream end face 15'b of the shifter 15', forming a stream such as to collide vertically with the vertical wall 37, which is shared with the feed gas mixture passage portion 30' of the material passage 1. Then, the shifted gas flows axially upward along the vertical wall 37 through the shifted gas passage 3, and is taken out from the shifted gas outlet 7 (arrow G in the figure).

In such a configuration, since the feed gas mixture passage portion 30' is adjacent to the vertical wall 37 shared with the shifted gas passage 3, heat transfers from the shifted gas, which has a higher temperature, to the feed gas mixture, which has a lower temperature, as in Embodiment 1. In such a heat exchange, since the shifted gas forms such a stream as to collide with the vertical wall 37 as described above, no heat transfer laminar film forms in the vicinity of the vertical wall 37; therefore, heat exchange from the shifted gas to the feed gas mixture is performed efficiently. In addition, the vertical wall 37 is heated by the radiant heat from the downstream end face 15'b of the shifter 15', which has been heated to a higher temperature than that of the upstream end face 15'a, and the heat is transferred from the vertical wall 37 to the feed gas mixture.

Thus, the present embodiment makes it possible to improve thermal efficiency by collecting heat from the shifted gas and the shifter 15' by the feed gas mixture. Moreover, the effect of trapping the heat generated by the shift reaction within the interior of the hydrogen generator is also attained because the shifted gas is discharged toward the reformer 10, which is arranged inward of the body. Furthermore, the shifter 15', having a lower temperature than the reformer 10, is arranged on the outer circumference of the reformer 10 so as to cover a major heat dissipating face of the reformer 10, and the flowing direction of the gas that passes through the shifter 15' (the direction perpendicular to the axial direction) is substantially perpendicular to the major flowing direction of the gas that passes through the reformer 10 (i.e., the axial direction), therefore, the dissipating heat amount from the reformer 10 can be suppressed effectively.

Still more, here, since the feed gas mixture passage portion 30' and the upstream passage 22 of the reformed gas passage 2 are directly in contact with each other with the shared vertical wall 39 interposed therebetween, heat is given from the reformed gas to the feed gas mixture through the vertical wall 39. In addition, the vertical wall 39 is heated by the radiant heat from the reformer 10, and the heat is transferred to the feed gas mixture through the vertical wall 39. Thus, in the feed gas mixture and the reformed gas, between which there exists a great temperature difference, heat can be collected from the reformed gas and the reformer 10 by the feed gas mixture. Consequently, such a configuration makes it possible to perform heat recovery more effectively. Moreover, because heat transfers from the reformed gas to the feed gas mixture, reducing a heat amount retained by the reformed gas, it becomes feasible at the same time to control the temperature of the reformed gas supplied to the shifter 15' at a temperature suitable for a shift reaction.

In the foregoing, the reformer 10 has a configuration in which a platinum group metal is carried on a metal oxide carrier shaped into a granular form, as in Embodiment 1, but it may have a configuration in which a platinum group metal is dispersed and carried on a film-state metal oxide carrier formed on a honeycomb substrate made of ceramic, metal, or the like, depending on the shape of the reformer 10.

Moreover, in the foregoing, the shifter 15' has a configuration in which a platinum group metal is carried on a metal oxide carrier shaped into a granular form; however, depending of the shape of the shifter 15', it is possible to adopt a configuration in which a platinum group metal is dispersed and carried on a film-state metal oxide carrier formed on a honeycomb substrate made of ceramic, metal, or the like. Furthermore, other than the platinum group metal, a base metal such as Cu—Zn type metal may be used as a shift catalyst. It should be noted that the advantageous effects attained by using a platinum group metal as the catalyst has already been discussed in Embodiment 1.

It should be arbitrary determined whether to employ a configuration in which the shifter 15' is arranged on the outer circumference of the reformer 10, as in the present embodiment, or to employ a configuration in which the shifter 15 is arranged on an axial end side of the reformer 10, as in Embodiments 1 to 3; nevertheless, it is preferable to select the appropriate configuration that enlarges the contact area between the shifted gas passage 3 and the material passage 1, because the larger contact area enables the more efficient heat exchange. Thereby, the advantageous effects attained by the present invention are more effectively exhibited. For example, the reformer 10 that constitutes the hydrogen generator is configured to have a longer axial length than the radial length. For this reason, in such a configuration, the configuration in which the shifter 15' is arranged on the outer circumference of the reformer 10 as in the present embodiment achieves the larger contact area and is therefore preferable.

[Fuel Cell System]

A fuel cell system according to the present embodiment is constructed such that the hydrogen generator of Embodiment 1 included in the fuel cell system of Embodiment 1 (FIG. 5) is replaced by the hydrogen generator of the present embodiment. This makes it possible to construct a fuel cell system comprising a hydrogen generator that can achieve the foregoing advantageous effects.

It should be noted that although excessive fuel in the fuel cell 151 is used as a fuel gas supplied to the burner 20 in the foregoing Embodiments 1 to 4, it is also possible to use, for example, other hydrocarbon-based fuels such as city gas, methane, LP gas, and kerosene, or hydrogen or the like, as the fuel gas. In addition, although town gas is used as a feed gas to be supplied to the reformer 10 in the foregoing Embodiments 1 to 4, other hydrocarbon-based materials may be used such as methane, LP gas, methanol, gasoline, or the like.

Furthermore, although the description has been made about cylinder-type hydrogen generators in which cylindrical-shaped gas passages are formed in a concentric circle-like manner in the foregoing Embodiments 1 to 4, the present invention can also be applied to hydrogen generators that have other shapes.

From the foregoing description, numerous improvements and other embodiments of the present invention will be readily apparent to those skilled in the art. Accordingly, the foregoing description is to be construed only as illustrative examples and as being presented for the purpose of suggesting the best mode for carrying out the invention to those skilled in the art. Various changes and modifications can be made in specific structures and/or functions substantially without departing from the scope and spirit of the invention.

INDUSTRIAL APPLICABILITY

The hydrogen generator according to the present invention is useful as a hydrogen generator used for a fuel cell system or the like.

The fuel cell system according to the present invention is useful as a fuel cell system or the like comprising a hydrogen generator in which its thermal efficiency is improved.

The invention claimed is:

1. A hydrogen generator comprising a reformer configured to generate a reformed gas mainly containing hydrogen from a material through a reforming reaction, a material passage configured to supply the material to said reformer, a shifter configured to lessen carbon monoxide in the reformed gas through a shift reaction, a reformed gas passage configured to supply the reformed gas from said reformer to said shifter, and a shifted gas passage configured to take out a shifted gas obtained from said shifter, wherein:

said hydrogen generator is configured to perform heat exchange between said shifted gas passage and said material passage;

an interior of a body of said hydrogen generator is partitioned by a plurality of axially-directed walls sharing a central axis and arranged opposing to one another at predetermined gaps, and by a plurality of radially-directed walls arranged at a predetermined end portion of said axially-directed walls so as to intersect with said axially-directed walls, so that said material passage, said reformed gas passage, and said shifted gas passage are formed in said body, said reformer is formed along the central axis, and said shifter is formed in the axial direction side of said reformer;

said material passage is arranged so as to surround an outer side of said reformer, one end portion thereof is connected to one end face of said reformer in the axial direction, and at least a portion thereof is formed along one end face of said reformer in the axial direction;

said reformed gas passage is arranged so as to surround an outer circumference of said reformer, one end portion thereof is connected to the other end face of said reformer in the axial direction, and another end portion thereof is connected to an upstream face of said shifter;

said shifter is arranged so as to oppose said one end face of said reformer in the axial direction with said material passage interposed therebetween; and said shifted gas passage is connected to a downstream end face of said shifter at one end portion thereof, and between said carbon monoxide shifter and said reformer opposing each other, said shifted gas passage is directly or indirectly in contact with a portion of said material passage that is along the end face of said reformer.

2. The hydrogen generator according to claim 1, wherein a heat generating portion of said shifter faces a wall portion of said shifted gas passage with a space interposed therebetween.

3. The hydrogen generator according to claim 1, wherein heat retained by a shifted gas obtained from said shifter is supplied to said material gas passage via said shifted gas passage.

4. The hydrogen generator according to claim 1, wherein said material passage is arranged more inward of said hydrogen generator than said shifted gas passage.

5. The hydrogen generator according to claim 1, wherein the shifted gas is discharged from the downstream end face of said shifter into said shifted gas passage so as to collide with, at the portion where said shifted gas passage and said material passage are in contact, a partition wall that partitions both of said passages, and thereafter, the shifted gas travels along said shifted gas passage.

6. The hydrogen generator according to claim 1, wherein, in said shifter, a gas traveling direction from said upstream face toward said downstream end face is substantially a vertical direction.

7. The hydrogen generator according to claim 1, wherein:
the material contains a hydrocarbon-based feed gas and water, and said material passage comprises a passage portion in which the feed gas and water travel in different phase states, a water evaporator configured to evaporate the water to produce steam, and a feed gas mixture passage portion in which a gas mixture of the feed gas and the steam travels; and
said material passage that is directly or indirectly in contact with said shifted gas passage is said feed gas mixture passage portion.

8. The hydrogen generator according to claim 1, wherein:
the material contains a hydrocarbon-based feed gas and water, and said material passage comprises a passage portion in which the feed gas and water travel in different phase states, a water evaporator configured to evaporate the water to produce steam, and a feed gas mixture passage portion in which a gas mixture of the feed gas and the steam travels; and
said material passage that is directly or indirectly in contact with said shifted gas passage is said passage portion in which the feed gas and water travel in different phase states.

9. The hydrogen generator according to claim 1, wherein:
the material contains a hydrocarbon-based feed gas and water, and said material passage comprises a feed gas passage portion in which only the feed gas travels, a passage portion in which the feed gas and water travel in different phase states, a water evaporator configured to evaporate the water to produce steam, and a feed gas mixture passage portion in which a gas mixture of the feed gas and the steam travels; and
said material passage that is directly or indirectly in contact with said shifted gas passage is said feed gas passage portion.

10. The hydrogen generator according to claim 1, wherein:
the material contains a hydrocarbon-based feed gas and water, and said material passage comprises a water passage portion in which only the water travels, a passage portion in which the water and the feed gas travel in different phase states, a water evaporator configured to evaporate the water to produce steam, and a feed gas mixture passage portion in which a gas mixture of the feed gas and the steam travels; and
said material passage that is directly or indirectly in contact with said shifted gas passage is said water passage portion.

11. The hydrogen generator according to claim 1, wherein said shifter is such that a platinum group metal serving as a shift catalyst is carried on a carrier composed of a metal oxide containing at least one selected from Al, Ce, and Zr.

12. The hydrogen generator according to claim 1, configured to perform heat exchange between said reformed gas passage and said material passage.

13. A fuel cell system, comprising:
a hydrogen generator according to claim 1; and
a fuel cell configured to generate power using a fuel gas and an oxidizing gas, the fuel gas containing hydrogen as its main component and being supplied from said hydrogen generator.

14. A hydrogen generator comprising a reformer configured to generate a reformed gas mainly containing hydrogen from a material through a reforming reaction, a material passage configured to supply the material to said reformer, a shifter configured to lessen carbon monoxide in the reformed gas through a shift reaction, a reformed gas passage configured to supply the reformed gas from said reformer to said shifter, and a shifted gas passage configured to take out a shifted gas obtained from said shifter, wherein:
said hydrogen generator is configured to perform heat exchange between said shifted gas passage and said material passage;
an interior of a body of said hydrogen generator is partitioned by a plurality of axially-directed walls sharing a central axis and arranged opposing to one another at predetermined gaps, and by a plurality of radially-directed walls arranged at a predetermined end portion of said axially-directed walls so as to intersect with said axially-directed walls, so that said material passage, said reformed gas passage, and said shifted gas passage are formed in said body, said reformer is formed along the central axis, and said shifter is formed so as to surround an outer side of said reformer in the axial direction;
said material passage is arranged so as to surround an outer side of said reformer, and one end portion thereof is connected to one end face of said reformer in the axial direction;
said reformed gas passage is arranged so as to surround an outer side of said material passage in the axial direction, one end portion thereof is connected to the other end face of said reformer in the axial direction, and the other end portion thereof is connected to an upstream face of said shifter;
said shifter is positioned between said reformed gas passage and said material passage and is arranged so as to surround said material passage in the axial direction; and
said shifted gas passage is connected to a downstream end face of said shifter at one end portion thereof, said shifted gas passage is directly or indirectly in contact with said material passage between said shifter and said reformer, and said shifted gas passage surrounds an outer side of said material passage in the axial direction.

15. The hydrogen generator according to claim 14, wherein a heat generating portion of said shifter faces a wall portion of said shifted gas passage with a space interposed therebetween.

16. The hydrogen generator according to claim 14, wherein heat retained by a shifted gas obtained from said shifter is supplied to said material gas passage via said shifted gas passage.

17. The hydrogen generator according to claim 14, wherein said material passage is arranged more inward of said hydrogen generator than said shifted gas passage.

18. The hydrogen generator according to claim 14, wherein the shifted gas is discharged from the downstream end face of said shifter into said shifted gas passage so as to collide with, at the portion where said shifted gas passage and said material passage are in contact, a partition wall that partitions both of said passages, and thereafter, the shifted gas travels along said shifted gas passage.

19. The hydrogen generator according to claim 14, wherein, in said shifter, a gas traveling direction from said upstream face toward said downstream end face is substantially a vertical direction.

20. The hydrogen generator according to claim 14, wherein:
the material contains a hydrocarbon-based feed gas and water, and said material passage comprises a passage portion in which the feed gas and water travel in different phase states, a water evaporator configured to evaporate the water to produce steam, and a feed gas mixture passage portion in which a gas mixture of the feed gas and the steam travels; and
said material passage that is directly or indirectly in contact with said shifted gas passage is said feed gas mixture passage portion.

21. The hydrogen generator according to claim 14, wherein:
the material contains a hydrocarbon-based feed gas and water, and said material passage comprises a passage portion in which the feed gas and water travel in different phase states, a water evaporator configured to evaporate the water to produce steam, and a feed gas mixture passage portion in which a gas mixture of the feed gas and the steam travels; and
said material passage that is directly or indirectly in contact with said shifted gas passage is said passage portion in which the feed gas and water travel in different phase states.

22. The hydrogen generator according to claim 14, wherein:
the material contains a hydrocarbon-based feed gas and water, and said material passage comprises a feed gas passage portion in which only the feed gas travels, a passage portion in which the feed gas and water travel in different phase states, a water evaporator configured to evaporate the water to produce steam, and a feed gas mixture passage portion in which a gas mixture of the feed gas and the steam travels; and
said material passage that is directly or indirectly in contact with said shifted gas passage is said feed gas passage portion.

23. The hydrogen generator according to claim 14, wherein:
the material contains a hydrocarbon-based feed gas and water, and said material passage comprises a water passage portion in which only the water travels, a passage portion in which the water and the feed gas travel in different phase states, a water evaporator configured to evaporate the water to produce steam, and a feed gas mixture passage portion in which a gas mixture of the feed gas and the steam travels; and
said material passage that is directly or indirectly in contact with said shifted gas passage is said water passage portion.

24. The hydrogen generator according to claim 14, wherein said shifter is such that a platinum group metal serving as a shift catalyst is carried on a carrier composed of a metal oxide containing at least one selected from Al, Ce, and Zr.

25. The hydrogen generator according to claim 14, configured to perform heat exchange between said reformed gas passage and said material passage.

26. A fuel cell system, comprising:
a hydrogen generator according to claim 14; and
a fuel cell configured to generate power using a fuel gas and an oxidizing gas, the fuel gas containing hydrogen as its main component and being supplied from said hydrogen generator.

* * * * *